(12) United States Patent
Hirtz

(10) Patent No.: US 10,837,553 B2
(45) Date of Patent: Nov. 17, 2020

(54) HYDRAULIC DEVICE COMPRISING A SEGMENT HAVING AT LEAST ONE THROUGH-HOLE CONFIGURED TO PROMOTE THE ROTATION OF SAID SEGMENT

(71) Applicant: AIRBUS SAS, Blagnac (FR)

(72) Inventor: Norbert Hirtz, Toulouse (FR)

(73) Assignee: AIRBUS SAS (FR)

( * ) Notice: Subject to any disclaimer, the term of this patent is extended or adjusted under 35 U.S.C. 154(b) by 0 days.

(21) Appl. No.: 16/688,126

(22) Filed: Nov. 19, 2019

(65) Prior Publication Data
US 2020/0173554 A1 Jun. 4, 2020

(30) Foreign Application Priority Data
Nov. 29, 2018 (FR) ...................... 18 72057

(51) Int. Cl.
*F16J 1/00* (2006.01)
*F16J 9/22* (2006.01)
*F15B 15/14* (2006.01)
*F16J 9/20* (2006.01)

(52) U.S. Cl.
CPC ........... *F16J 1/008* (2013.01); *F15B 15/1452* (2013.01); *F16J 9/22* (2013.01); *F16J 9/20* (2013.01)

(58) Field of Classification Search
CPC ...... F16J 1/003; F16J 1/008; F16J 9/20; F16J 9/22; F16J 15/443; F15B 15/1452; F15B 2201/312
See application file for complete search history.

(56) References Cited

U.S. PATENT DOCUMENTS

| | | | | |
|---|---|---|---|---|
| 1,649,474 A | * | 11/1927 | Johnston | F16J 9/20 277/457 |
| 2,303,665 A | * | 12/1942 | Smith | F16J 9/20 277/466 |
| 4,128,250 A | * | 12/1978 | Barth | F16J 9/22 277/456 |
| 5,169,162 A | * | 12/1992 | Azaml | F16J 9/22 277/465 |

FOREIGN PATENT DOCUMENTS

WO 9711294 A1 3/1997

* cited by examiner

*Primary Examiner* — Michael Leslie
(74) *Attorney, Agent, or Firm* — Lerner, David, Littenberg, Krumholz & Mentlik, LLP

(57) ABSTRACT

A hydraulic device includes a cylinder, a piston that is able to move in the cylinder, and a segment which is interposed between the cylinder and the piston and which includes at least one leakage duct that is configured to generate a hydraulic film, between the segment and the piston, reducing friction and to orient a hydraulic flow leaving the leakage duct which causes the segment to rotate about the piston.

13 Claims, 2 Drawing Sheets

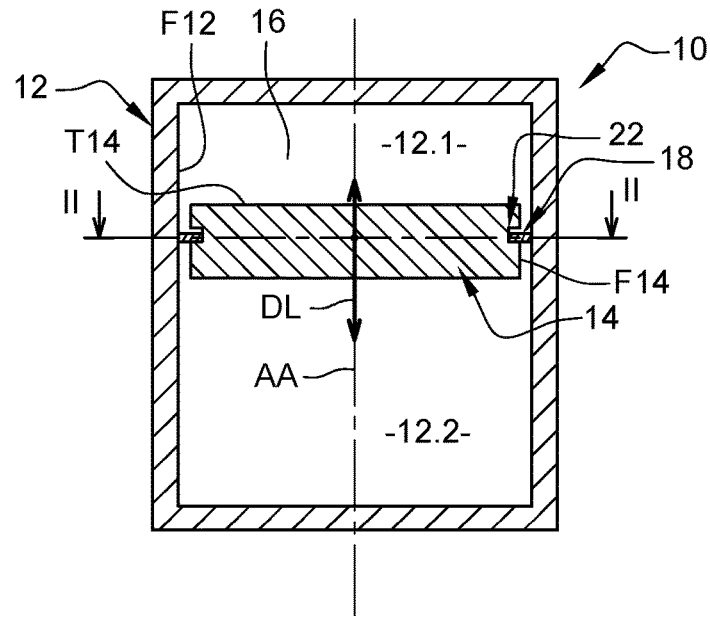
Fig. 1
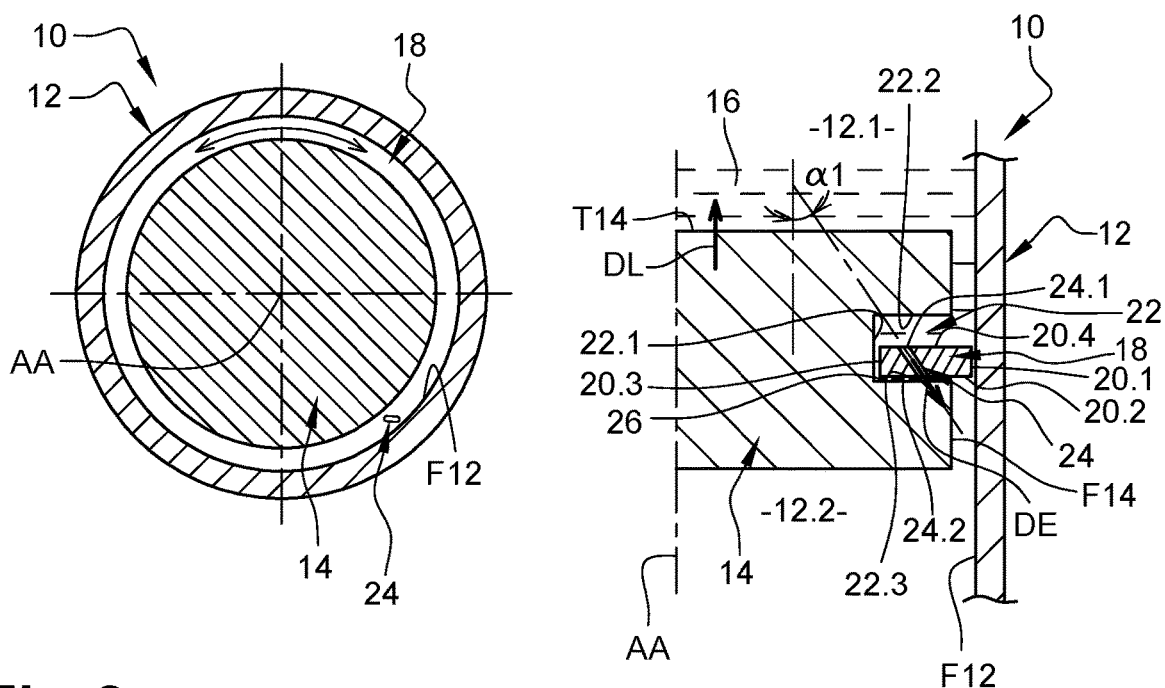
Fig. 2
Fig. 3
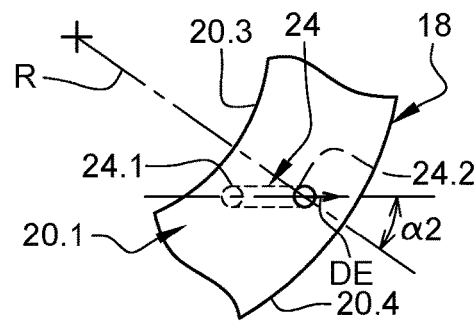
Fig. 4

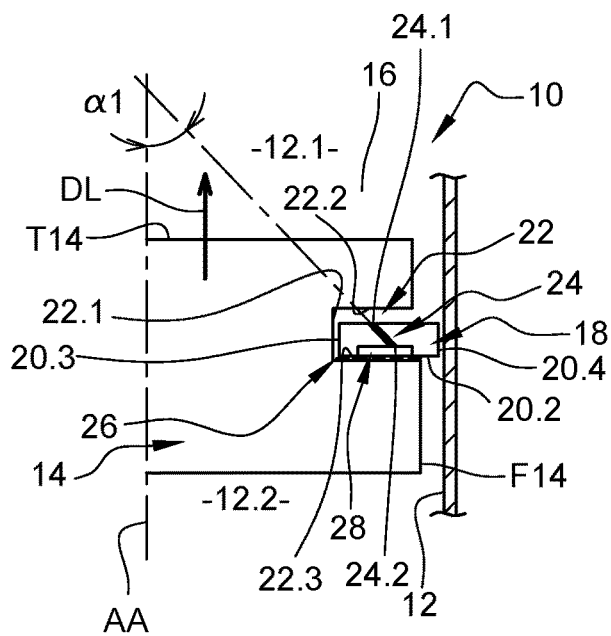
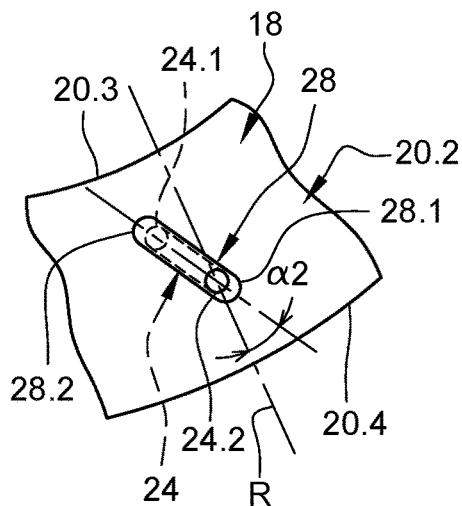
Fig. 5
Fig. 6
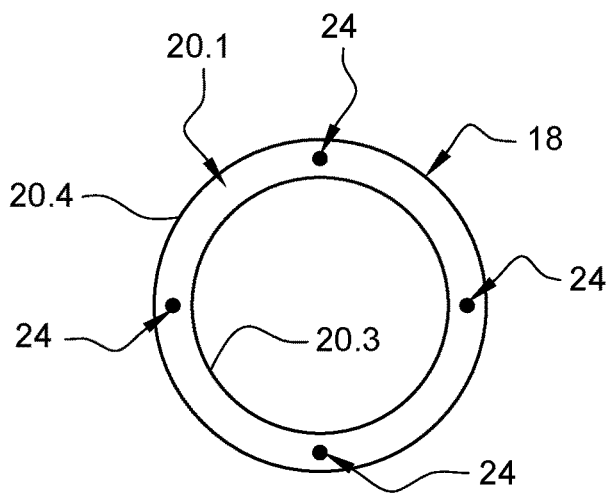
Fig. 7
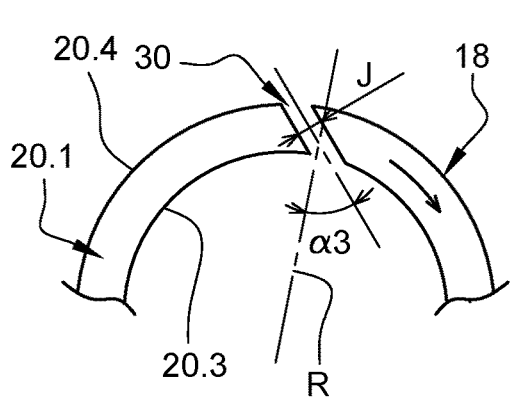
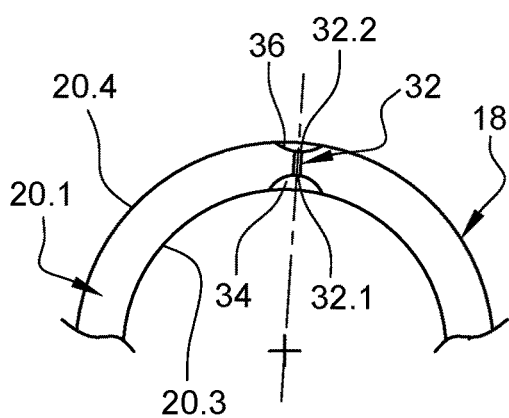
Fig. 8
Fig. 9

HYDRAULIC DEVICE COMPRISING A SEGMENT HAVING AT LEAST ONE THROUGH-HOLE CONFIGURED TO PROMOTE THE ROTATION OF SAID SEGMENT

FIELD OF THE INVENTION

The present application relates to a hydraulic device comprising a segment having at least one through-hole configured to promote the rotation of said segment.

BACKGROUND OF THE INVENTION

It is known for a hydraulic device to comprise a cylinder and a piston positioned in the cylinder so as to separate the interior of the cylinder into first and second chambers, said piston being able to move in translation in said cylinder so as to vary the volume of the first chamber, which contains a hydraulic fluid. The piston has a cylindrical outer lateral face opposite a cylindrical inner lateral face of the cylinder.

The hydraulic device also comprises a segment interposed between the outer lateral face of the piston and the inner lateral face of the cylinder so as to establish a seal between the piston and the cylinder in order to keep the hydraulic fluid in the first chamber. The segment is in the form of a ring and is received partially within a peripheral channel provided on the outer lateral face of the piston, the outer edge of the segment being in contact with the inner lateral face of the cylinder.

In order to reduce friction between the segment and the cylinder, the inner lateral face of the cylinder and the outer edge of the segment have matching shapes which are configured so as to cause the segment to rotate about the piston when the piston moves in translation.

This embodiment is not entirely satisfactory because vibration can cause localized wear of the segment and/or of the inner lateral face of the cylinder. This localized wear can in some cases immobilize the piston in the cylinder.

BRIEF SUMMARY OF THE INVENTION

Aspects of the present invention may remedy all or some of the drawbacks of the prior art.

An embodiment of the invention includes a hydraulic device comprising:
  a cylinder,
  a piston positioned in the cylinder so as to delimit a first chamber containing a hydraulic fluid and able to move in translation in the cylinder in a longitudinal direction, said piston having an outer lateral face opposite an inner lateral face of the cylinder,
  a channel, provided on the outer lateral face of the piston, having a bottom and first and second lateral walls, the first lateral wall being closer to the first chamber,
  a segment, received in the channel, having a first face that, in operation, is oriented towards the first lateral wall of the channel, a second face that, in operation, is oriented towards the second lateral wall of the channel, an inner edge face that, in operation, is oriented towards the bottom of the channel and an outer edge face that, in operation, is oriented towards the inner lateral face of the cylinder.

According to an embodiment of the invention, the segment comprises at least one leakage duct, communicating with the first chamber, which has an end portion that opens onto the second face and is configured to orient a hydraulic flow leaving the leakage duct in an ejection direction against the second lateral wall of the channel, said ejection direction forming a first non-zero angle with the longitudinal direction and/or a second non-zero angle with a radius of the piston.

The hydraulic flow leaving the leakage duct generates a hydraulic film between the segment and the second lateral wall of the channel, reducing friction between the segment and the piston. Owing to the orientation of the ejection direction being inclined with respect to the longitudinal direction and/or with respect to the radius, the hydraulic flow leaving the leakage duct causes the segment to rotate about the piston.

According to another feature, the first angle and the second angle are non-zero.

According to another feature, the first angle is such that the ejection direction tends to approach the inner lateral face of the cylinder in the flow direction of the hydraulic flow.

According to another feature, the first angle is between 30 and 60° and/or the second angle is between 30 and 60°.

According to another feature, each leakage duct has a cross section of between 0.2 and 0.8 mm.

According to another feature, the second face of the segment comprises at least one hollow, into which a leakage duct opens and which has an oblong shape comprising a first end that, in operation, is close to an edge that the second lateral wall of the channel shares with the outer lateral face of the piston, and a second end that, in operation, is close to an edge that the second lateral wall shares with the bottom of the channel.

According to one configuration, the oblong shape of the hollow has a large dimension oriented in the same way as the leakage duct.

According to another feature, the segment comprises multiple leakage ducts evenly distributed over the entire circumference of the segment.

According to one configuration, the leakage ducts are arranged in diametrically opposite pairs.

According to another feature, the segment comprises a slot by means of which it is possible to expand the segment, which has a clearance calibrated so as to generate a hydraulic flow, towards the second lateral wall of the channel, that is homogeneous with hydraulic flows generated by the leakage ducts such that the segment remains substantially perpendicular to the longitudinal direction.

According to one configuration, the slot is oriented so as to promote the rotation of the segment in the same direction as that produced by the leakage ducts.

According to another feature, the segment comprises at least one transverse duct which has a first orifice that opens onto the inner edge face and a second orifice that opens onto the outer edge face.

According to one configuration, the inner edge face has a first cup into which the transverse duct opens via the first orifice and/or the outer edge face has a second cup into which the transverse duct opens via the second orifice.

BRIEF DESCRIPTION OF THE DRAWINGS

Other features and advantages will emerge from the following description of the invention, which description is given solely by way of example, with reference to the appended drawings in which:

FIG. 1 is a longitudinal section through a hydraulic device, illustrating an embodiment of the invention, FIG. 2 is a transverse section on line II-II of FIG. 1, FIG. 3 is a longitudinal section through a part of a hydraulic device showing in detail a segment of a hydraulic device, illustrating a first embodiment of the invention, FIG. 4 is a view from above of the segment shown in FIG. 3, FIG. 5 is a longitudinal section through a part of a hydraulic device showing in detail a segment of a hydraulic device, illustrating a second embodiment of the invention, FIG. 6 is a view from below of the segment shown in FIG. 5, FIG. 7 is a view from above of a segment, illustrating another embodiment according to the invention, FIG. 8 is a view from above of part of a segment, illustrating another embodiment according to the invention, and FIG. 9 is a view from above of part of a segment, illustrating another embodiment according to the invention.

DETAILED DESCRIPTION

FIGS. 1 to 3 and 5 show, labelled 10, a hydraulic device which comprises a cylinder 12 and a piston 14 positioned in the cylinder 12 so as to separate the interior of the cylinder 12 into first and second chambers 12.1, 12.2, said piston 14 being able to move in translation in said cylinder 12 so as to vary the volume of the first chamber 12.1, which contains a hydraulic fluid 16. The piston 14 has an outer lateral face F14 opposite an inner lateral face F12 of the cylinder 12.

The hydraulic device 10 may for example be an internal combustion engine, a hydraulic actuator, or other device.

The cylinder 12 and the piston 14 have matching cross sections allowing the piston 14 to move in translation in a direction referred to as the longitudinal direction DL. According to one configuration, the cylinder 12 and the piston 14 are cylindrical and coaxial and have the same axis AA which is parallel to the longitudinal direction DL. The piston 14 comprises an end face T14 that is in contact with the hydraulic fluid 16 of the chamber 12.1.

The hydraulic device 10 also comprises a segment 18 interposed between the outer lateral face F14 of the piston 14 and the inner lateral face F12 of the cylinder 12 so as to establish a seal between the piston 14 and the cylinder 12 in order to keep the hydraulic fluid 16 in the first chamber 12.1. The segment 18 is in the shape of a ring. It has a first face 20.1 that, in operation, is oriented towards the first chamber 12.1, a second face 20.2 that, in operation, is oriented towards the second chamber 12.2, an inner edge face 20.3 that connects the first and second faces 20.1, 20.2 and, in operation, is oriented towards the axis AA of the piston 14 and finally an outer edge face 20.4 that connects the first and second faces 20.1, 20.2 and, in operation, is oriented towards the inner lateral face F12 of the cylinder.

According to one configuration, the first and second faces 20.1, 20.2 are planar and parallel, the inner and outer edge faces 20.3, 20.4 are cylindrical and perpendicular to the first and second faces 20.1, 20.2.

The piston 14 comprises a peripheral channel 22 for receiving the segment 18. This channel 22 comprises a cylindrical bottom 22.1 that is coaxial with the axis AA of the piston 14, and first and second lateral walls 22.2, 22.3 that are parallel to one another and perpendicular to the axis AA of the piston 14, the first lateral wall 22.2 being closer to the end face T14 and to the chamber 12.1.

In operation, the first face 20.1 of the segment 18 is oriented towards the first lateral wall 22.2 of the channel 22, the second face 20.2 of the segment 18 is oriented towards the second lateral wall 22.3 of the channel 22 and the inner edge face 20.3 is oriented towards the bottom 22.1 of the channel 22.

The diameter of the bottom 22.1 is equal to or very slightly less than the diameter of the inner edge face 20.3. The diameter of the outer edge face 20.4 of the segment 18 is approximately equal to the diameter of the inner lateral face F12 of the cylinder 12. The first and second lateral walls 22.2, 22.3 are spaced apart from one another by a distance slightly greater than the thickness of the segment 18 (dimension separating the first and second faces 20.1, 20.2 of the segment 18).

In operation, since the first chamber 12.1 has a pressure greater than that of the second chamber 12.2, the segment 18 is pressed against the second lateral wall 22.3 of the channel 22.

The hydraulic device 10 comprises a system for rotating the segment 18 about the axis AA of the piston 14 when the latter moves in translation in the longitudinal direction DL.

The system for rotating the segment 18 comprises at least one leakage duct 24 which passes through the segment 18 and which has a first orifice 24.1 that opens onto the first face 20.1 and a second orifice 24.2 that opens onto the second face 20.2. The second orifice 24.2 is positioned in line with the second lateral wall 22.3 of the channel and not in line with the space between the piston 14 and the cylinder 12.

According to one configuration, the leakage duct 24 is cylindrical and straight. Of course, the invention is not limited to this configuration. Whatever the configuration, the leakage duct 24 communicates with the first chamber 12.1 and comprises an end portion that opens onto the second face 20.2 and is configured to orient a hydraulic flow leaving the leakage duct 24 in an ejection direction DE against the second lateral wall 22.3 of the channel 22. When the leakage duct 24 is straight, it is oriented in the ejection direction DE.

According to one feature, the ejection direction DE forms a first non-zero angle α1 with the longitudinal direction DL (or the axis AA of the piston 14) and/or a second non-zero angle α2 with a radius R of the piston 14 (a straight line located in a transverse plane, perpendicular to the axis AA of the piston 14, passing through the axis AA of the piston and the centre of the second orifice 24.2).

The angle α1 is such that the direction DE tends to approach the inner lateral face F12 of the cylinder 12 in the flow direction of the flow. When the leakage duct 24 is straight, the first orifice 24.1 is closer to the axis AA of the piston 14 than the second orifice 24.2.

The leakage duct 24 has an appropriate cross section depending on the required performance. In particular, in one exemplary embodiment, this cross section is greater than 0.2 mm and less than 0.8 mm. The leakage duct 24 has a cross section which is dimensioned so as to establish a calibrated leakage of hydraulic fluid 16 from the first chamber 12.1 towards the second chamber 12.2. The cross section of the leakage duct 24 is dimensioned so as to generate a hydraulic film 26 which reduces friction between the segment 18 and the second lateral wall 22.3 of the channel 22, and for rotating the segment 18 without however excessively impairing the performance of the hydraulic device 10.

The first angle α1 is between 30 and 60°. The second angle α2 is between 30 and 60°.

According to an embodiment of the invention, the hydraulic flow leaving the leakage duct 24 is sprayed against the second lateral wall 22.3 of the channel 22 and generates a hydraulic film 26, between the segment 18 and the second lateral wall 22.3 of the channel 22, reducing friction between the segment 18 and the piston 14. Owing to the orientation of the ejection direction DE being inclined with respect to the longitudinal direction and/or with respect to the radius, the hydraulic flow leaving the leakage duct 24 causes the segment 18 to rotate, relative to the piston 14, about the axis AA of the piston 14.

The rotation of the segment 18 promotes the distribution of the hydraulic film 26 over the entire circumference of the second lateral wall 22.3 of the channel 22.

According to one embodiment, shown in FIG. 7, the system for rotating the segment 18 comprises multiple leakage ducts 24 evenly distributed over the entire circumference of the segment 18. This configuration makes it possible to distribute the forces generated by the hydraulic flows issuing from the leakage ducts 24 homogeneously over the entire circumference of the segment 18 in order to maintain the segment 18 in a plane substantially perpendicular to the axis AA of the piston 14 in order to thereby reduce the risk of the piston 14 jamming in the cylinder 12. According to one configuration, the segment 18 comprises leakage ducts 24 arranged in diametrically opposite pairs.

According to another feature, the second face 20.2 of the segment 18 comprises at least one hollow 28, into which a leakage duct 24 opens. According to one configuration, the second face 20.2 of the segment 18 comprises a hollow 28 for each leakage duct 24.

The hollow 28 has a depth (dimension considered in the longitudinal direction DL) substantially equal to the diameter of the leakage duct 24.

In a transverse plane, the hollow 28 has an oblong shape configured to promote the diffusion of the hydraulic film over essentially the entire surface of the second lateral wall 22.3 of the channel 22. The oblong shape of the hollow 28 has a width (smaller dimension) slightly greater than the diameter of the leakage duct 24 and a length (larger dimension) which extends from a first end 28.1 close to the edge that, in operation, the second lateral wall 22.3 shares with the outer lateral face F14 of the piston 14 to a second end 28.2 close to the edge that, in operation, the second lateral wall 22.3 shares with the bottom 22.1.

The larger dimension of the oblong shape of the hollow 28 is oriented so as to form an angle with a radius R identical with the second angle α2. Thus, the hollow 28 is oriented in the same way as the leakage duct 24 and does not disrupt the rotating effect produced by the leakage duct 24.

The leakage duct 24 and the hollow 28 serve to establish a calibrated leakage of hydraulic fluid from the first chamber 12.1 towards the second chamber 12.2. The leakage duct 24 and the hollow 28 are dimensioned so as to generate a hydraulic film 26 which reduces friction between the segment 18 and the second lateral wall 22.3 of the channel 22, and for rotating the segment 18 without however excessively impairing the performance of the hydraulic device 10.

According to one embodiment, the segment 18 comprises a slot 30 by means of which it is possible to expand the segment 18 in order to position it around the piston 14 and in the channel 22.

When the segment 18 comprises multiple leakage ducts 24, one of these may be replaced with the slot 30. In this case, the slot 30 has a clearance J (also termed "closed gap") calibrated so as to generate a hydraulic flow, towards the second lateral wall 22.3, that is homogeneous with the hydraulic flows generated by the leakage ducts 24 such that the segment 18 remains substantially perpendicular to the axis AA of the piston 14. The slot 30 is oriented so as to promote the rotation of the segment 18 in the same direction as that produced by the leakage ducts 24. According to one configuration, the slot 30 forms, with a radius R, a third non-zero angle α3, equal to the second angle α2 according to one configuration.

According to another feature, the segment 18 comprises at least one transverse duct 32, the axis of which is positioned approximately in a transverse plane and which has a first orifice 32.1 that opens onto the inner edge face 20.3 and a second orifice 32.2 that opens onto the outer edge face 20.4. The inner edge face 20.3 being spaced apart from the bottom 22.1 of the channel 22, the hydraulic fluid can enter each transverse duct 32 via the first orifice 32.1 and leave the transverse duct 32 via the second orifice 32.2 so as to generate a hydraulic film between the outer edge face 20.4 of the segment 18 and the inner lateral face F12 of the cylinder 12, reducing friction between them.

According to one configuration, the inner edge face 20.3 has a first cup 34 into which the transverse duct 32 opens via the first orifice 32.1 and/or the outer edge face 20.4 has a second cup 36 into which the transverse duct 32 opens via the second orifice 32.2. The first cup 34 makes it easier for the hydraulic fluid to enter the transverse duct 32. The second cup 36 promotes the distribution of the hydraulic fluid between the outer edge face 20.4 of the segment 18 and the inner lateral face F12 of the cylinder 12.

The segment 18 may comprise multiple transverse ducts 32. Moreover, each transverse duct 32 may form a non-zero angle with a radius so as to promote the rotation of the segment in the same direction as the leakage ducts 24.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A hydraulic device comprising:
a cylinder;
a piston positioned in the cylinder so as to delimit a first chamber containing a hydraulic fluid and configured to move in translation in the cylinder in a longitudinal direction, said piston having an outer lateral face opposite an inner lateral face of the cylinder;
a channel, provided on the outer lateral face of the piston, having a bottom and first and second lateral walls, the first lateral wall closer to the first chamber;
a segment, received in the channel, having a first face that, in operation, is oriented towards the first lateral wall of the channel, a second face that, in operation, is oriented towards the second lateral wall of the channel, an inner edge face that, in operation, is oriented towards the bottom of the channel and an outer edge face that, in operation, is oriented towards the inner lateral face of the cylinder;
a system for rotating the segment about the piston when the piston moves in translation in the longitudinal direction, wherein the system for rotating the segment comprises at least one leakage duct, communicating with the first chamber, having an end portion that opens onto the second face and configured to orient a hydraulic flow leaving the leakage duct in an ejection direction against the second lateral wall of the channel, said ejection direction forming a first non-zero angle with the longitudinal direction and/or a second non-zero angle with a radius of the piston.

2. The hydraulic device according to claim 1, wherein the first angle is such that the ejection direction tends to approach the inner lateral face of the cylinder in the flow direction of the hydraulic flow.

3. The hydraulic device according to claim 1, wherein the first angle is between 30 and 60°.

4. The hydraulic device according to claim 1, wherein the second angle is between 30 and 60°.

5. The hydraulic device according to claim 1, wherein each of the at least one leakage duct has a cross section of between 0.2 and 0.8 mm.

6. The hydraulic device according to claim 1, wherein the second face of the segment comprises at least one hollow, into which one of the at least one leakage duct opens and which has an oblong shape comprising a first end that, in operation, is close to an edge that the second lateral wall of the channel shares with the outer lateral face of the piston, and a second end that, in operation, is close to an edge that the second lateral wall shares with the bottom of the channel.

7. The hydraulic device according to claim 6, wherein the oblong shape of the hollow has a large dimension oriented in the same way as the leakage duct.

8. The hydraulic device according to claim 1, wherein the at least one leakage duct comprises multiple leakage ducts evenly distributed over the entire circumference of the segment.

9. The hydraulic device according to claim 8, wherein the multiple leakage ducts are arranged in diametrically opposite pairs.

10. The hydraulic device according to claim 8, wherein the segment comprises a slot by which it is possible to expand the segment, which has a clearance calibrated so as to generate a hydraulic flow, towards the second lateral wall of the channel, that is homogeneous with hydraulic flows generated by the multiple leakage ducts such that the segment remains substantially perpendicular to the longitudinal direction.

11. The hydraulic device according to claim 10, wherein the slot is oriented so as to promote the rotation of the segment in the same direction as that produced by the leakage ducts.

12. The hydraulic device according to claim 1, wherein the segment comprises at least one transverse duct having a first orifice that opens onto the inner edge face and a second orifice that opens onto the outer edge face.

13. The hydraulic device according to claim 12, wherein the inner edge face has a first cup into which the transverse duct opens via the first orifice and/or the outer edge face has a second cup into which the transverse duct opens via the second orifice.

\* \* \* \* \*